S. P. JONES.
LUBRICATOR.
APPLICATION FILED JAN. 11, 1916.
1,177,186.
Patented Mar. 28, 1916.
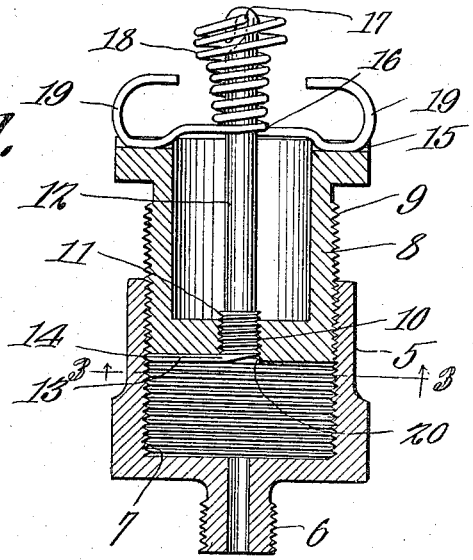
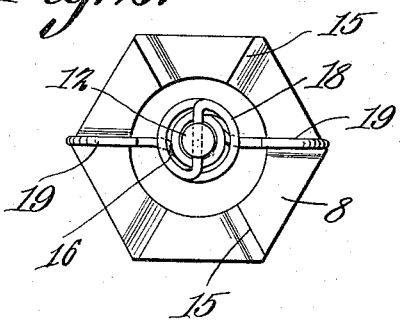
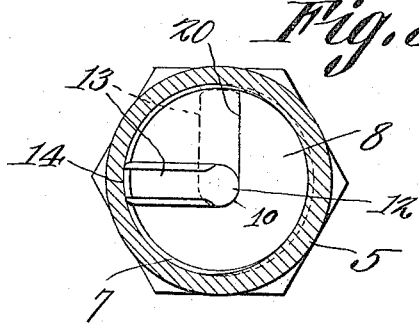
Samuel P. Jones
Inventor,
By
Attorneys
THE COLUMBIA PLANOGRAPH CO., WASHINGTON, D. C.

UNITED STATES PATENT OFFICE.

SAMUEL P. JONES, OF COLUMBIA, SOUTH CAROLINA.

LUBRICATOR.

1,177,186.  Specification of Letters Patent.  Patented Mar. 28, 1916.

Application filed January 11, 1916. Serial No. 71,495.

*To all whom it may concern:*

Be it known that I, SAMUEL P. JONES, a citizen of the United States, residing at Columbia, in the county of Richland and State of South Carolina, have invented certain new and useful Improvements in Lubricators, of which the following is a specification.

This invention relates to that class of grease boxes and plugs which are used in grease lubrication of machinery, and which, ordinarily, consist of a grease box for the reception of the grease, a plug which is screwed into the box to compress and force the grease therefrom, and a jam-nut to prevent loss of the plug. This structure is unsatisfactory for the reason that the jam-nut is apt to be so tight as to necessitate the application of heavy blows for its removal (which often breaks or injures the box); or, the jam-nut is too loose and is thus liable to get lost.

The invention therefore has for its object to provide a structure which is devoid of the objections noted, and this object is attained by means of a novel combination and arrangement of parts to be hereinafter described and claimed, reference being had to the accompanying drawing forming a part of this specification.

In the drawing, Figure 1 is a vertical section of the device; Fig. 2 is a plan view thereof; Fig. 3 is a horizontal section on the line 3—3 of Fig. 1, and Fig. 4 is an enlarged elevation of the lower end of the plug.

Referring specifically to the drawing, 5 denotes a grease box or cup having a threaded outlet nipple 6 at the bottom for attachment to the part to be supplied with grease. The box is threaded interiorly, as indicated at 7, to receive a screw plug 8 whereby the grease is compressed and forced from the box, the threads 9 of the plug matching the threads 7 of the box. The plug is hollow throughout nearly its entire length, and in the bottom portion of the plug is a threaded aperture 10 into which is screwed the threaded lower end 11 of a stem 12 extending longitudinally through the plug. This stem is rotatable for a purpose to be presently described, and its upper end carries a means whereby it is held against rotation. At the lower end of the stem 12, beneath the bottom of the plug 8, is a lateral finger 13 having its outer end reduced to a sharp edge 14 so that it may enter between the threads 7 of the box 5. The stem 12 is positioned off the center of the plug and the length of the finger 13 is such that its end 14 may be projected to engage the threads 7 to lock the plug in the box. In the top of the plug 8 are notches 15 engageable by a spring 16 carried by the stem 12 to hold or lock the same against turning in a direction to disengage the finger 13 from the threads 7, and also to serve as a convenient means for operating the stem. The upper end of the stem has a notch 17 to hold the spring, the latter being coiled around the stem as indicated at 18 and extending in opposite directions therefrom to engage diametrically opposite ones of the notches 15. The outer ends of the spring are bent into finger pieces 19 to facilitate application and release. The bottom of the plug 8 is beveled so that one side is higher than the other, this bevel or slant corresponding to the slant of the threads 9, and forming a transverse shoulder 20 extending across the bottom of the plug from the aperture 10 to the edge of the plug. This shoulder prevents the swing of the finger 13 past the same, and forms an obstacle to the reverse action of the finger, the latter being, however, free to swing away from the shoulder into locking position as in Fig. 3. The edges of the finger are beveled so that the finger can swing through the grease with ease.

When the stem 12 is turned to position the finger 13 alongside the shoulder 20, the outer end 14 of the stem is retracted and does not project beyond the side of the plug 8, so that the latter may now be screwed down in the box 5 to compress the grease. When sufficient compression is obtained, it will be possible to lock the plug by simply disengaging the spring 16 from the notches 15 and turning the stem in a direction to carry the finger 13 away from the shoulder 20. This movement of the finger, by the off-center position of the stem, projects the end 14 of the finger beyond the side of the plug and between the threads 7. If the plug should now have a tendency to unscrew from any cause whatsoever, the finger end 14 will jam tighter between the threads 7, thereby automatically locking the plug and preventing it from unscrewing. To additionally compress the grease at any time it will be necessary only to apply a wrench to the plug and turn the same to the right, after which the spring 16 is turned sufficiently to the right to force the finger 13 again into jamming and locking position. To remove the plug, the stem must be turned to swing the finger back against the shoulder 20, which draws it inward and disengages it from the threads 7, after which the plug can be unscrewed.

The threads 11 of the stem 12 have the same pitch as the threads 7 of the box 5, so that the finger 13 will always jam the threads 7 properly, regardless of the position of the finger, and the threads will never be broken or mutilated. It will also be noted that in screwing the plug 8 to compress the grease, the finger 13 comes back against the shoulder 20 and prevents any overstrain on the spring 16, thereby eliminating danger of breaking said spring.

I claim:—

1. The combination of a grease cup threaded interiorly, a compression plug screwed into the cup, and a rotatable longitudinal stem carried by the plug off the center thereof and having a laterally projecting finger opposite the end of the plug which is in the cup, the outer end of the finger jamming the threads of the cup when the stem is turned in one direction, and retracting to clear the threads when the stem is turned in the opposite direction.

2. The combination of a grease cup threaded interiorly, a compression plug screwed into the cup, a rotatable longitudinal stem carried by the plug off the center thereof and having a laterally projecting finger opposite the end of the plug which is in the cup, the outer end of the finger jamming the threads of the cup when the stem is turned in one direction, and retracting to clear the threads when the stem is turned in the opposite direction, and a means for locking the stem.

3. The combination of a grease cup, threaded interiorly, a compression plug screwed into the cup, and a rotatable longitudinal stem carried by the plug off the center thereof and having a laterally projecting finger opposite the end of the plug which is in the cup, the outer end of the finger jamming the threads of the cup when the stem is turned in one direction, and retracting to clear the threads when the stem is turned in the opposite direction, said stem having a threaded engagement with the plug and the threads of the stem corresponding in pitch to the pitch of the cup threads.

4. The combination of a grease cup threaded interiorly, a compression plug screwed into the cup, and a rotatable longitudinal stem carried by the plug off the center thereof and having a laterally projecting finger opposite the end of the plug which is in the cup, said end of the plug being beveled on one side corresponding to the slant of the threads of the plug and forming a transverse shoulder which is in the path of the finger, the outer end of the finger jamming the threads of the cup when the stem is turned in one direction, and retracting to clear the threads when the stem is turned in the opposite direction.

5. The combination of a grease cup threaded interiorly, a compression plug screwed into the cup, and a rotatable longitudinal stem carried by the plug off the center thereof and having a laterally projecting finger opposite the end of the plug which is in the cup, said end of the plug having a transverse shoulder which is in the path of the finger, the outer end of the finger jamming the threads of the cup when the stem is turned in one direction, and retracting to clear the threads when the stem is turned in the opposite direction.

6. The combination of a grease cup threaded interiorly, a compression plug screwed into the cup, a rotatable longitudinal stem carried by the plug off the center thereof and having a laterally projecting finger opposite the end of the plug which is in the cup, the outer end of the finger jamming the threads of the cup when the stem is turned in one direction, and retracting to clear the threads when the stem is turned in the opposite direction, and resilient means for locking the stem.

7. The combination of a grease cup threaded interiorly, a compression plug screwed into the cup, a rotatable longitudinal stem carried by the plug off the center thereof and having a laterally projecting finger opposite the end of the plug which is in the cup, the outer end of the finger jamming the threads of the cup when the stem is turned in one direction, and retracting to clear the threads when the stem is turned in the opposite direction, and spring fingers extending from the upper end of the stem, the corresponding end of the plug having locking notches engageable by said fingers.

In testimony whereof I affix my signature.

SAMUEL P. JONES.

Copies of this patent may be obtained for five cents each, by addressing the "Commissioner of Patents, Washington, D. C."